(12) United States Patent
Takahashi

(10) Patent No.: US 11,491,825 B2
(45) Date of Patent: Nov. 8, 2022

(54) STRUCTURAL COLOR DEVELOPING MEMBER AND TIRE

(71) Applicant: The Yokohama Rubber Co., LTD., Tokyo (JP)

(72) Inventor: Ryota Takahashi, Hiratsuka (JP)

(73) Assignee: The Yokohama Rubber Co., LTD., Tykoy (JP)

( * ) Notice: Subject to any disclaimer, the term of this patent is extended or adjusted under 35 U.S.C. 154(b) by 363 days.

(21) Appl. No.: 16/639,506

(22) PCT Filed: Oct. 16, 2018

(86) PCT No.: PCT/JP2018/038428
§ 371 (c)(1),
(2) Date: Feb. 14, 2020

(87) PCT Pub. No.: WO2019/082729
PCT Pub. Date: May 2, 2019

(65) Prior Publication Data
US 2020/0254825 A1 Aug. 13, 2020

(30) Foreign Application Priority Data

Oct. 27, 2017 (JP) .............................. JP2017-208167
Oct. 27, 2017 (JP) .............................. JP2017-208170

(51) Int. Cl.
*G02B 5/18* (2006.01)
*B60C 13/00* (2006.01)
*G02B 5/30* (2006.01)
*G02B 5/26* (2006.01)

(52) U.S. Cl.
CPC .......... *B60C 13/001* (2013.01); *G02B 5/1861* (2013.01); *G02B 5/26* (2013.01); *G02B 5/3016* (2013.01); *Y10T 428/24537* (2015.01)

(58) Field of Classification Search
CPC ................... B60C 13/001; B60C 13/00; Y10T 428/24537; Y10T 428/24554;
(Continued)

(56) References Cited

U.S. PATENT DOCUMENTS 8,233,218 B1 * 7/2012 Mossberg ............ A44C 17/007
63/32
10,955,587 B2 * 3/2021 Bee ....................... A43B 13/122
(Continued)

FOREIGN PATENT DOCUMENTS

| CN | 102458873 | 5/2012 |
|---|---|---|
| JP | 2005-289334 | 10/2005 |

(Continued)

OTHER PUBLICATIONS

International Search Report for International Application No. PCT/JP2018/038428 dated Jan. 22, 2020, 4 pages, Japan.

*Primary Examiner* — Arnel C Lavarias
(74) *Attorney, Agent, or Firm* — Thorpe North & Western

(57) ABSTRACT

A structural color developing member includes: a base material including a surface, at least a portion of which is provided with a fine ridged/grooved structure formed at a constant arrangement pitch, the base material developing a structural color by the fine ridged/grooved structure; and a color developing layer layered on a surface of the fine ridged/grooved structure. The color development from the color developing layer is a hue included in color development of the structural color, and a region of the structural color developing member in which the fine ridged/grooved structure and the color developing layer are provided is visually recognizable in a single hue. Instead of the color developing layer, a polarized reflection layer may be provided.

17 Claims, 8 Drawing Sheets

(58) Field of Classification Search
CPC ...... G02B 5/1861; G02B 5/26; G02B 5/3016;
G02B 5/18; G02B 5/1809; G02B 5/22;
G02B 5/223; G02B 5/28; G02B 1/118;
G02B 5/30
USPC ........ 428/165, 159, 161; 252/582, 585, 586;
359/483.01, 487.01, 487.02, 487.06,
359/491.01, 493.01, 558, 566, 567, 569,
359/570, 572, 576, 577, 580, 582, 584,
359/586, 588, 589, 590
See application file for complete search history.

(56) References Cited

U.S. PATENT DOCUMENTS

| | | |
|---|---|---|
| 2012/0015118 A1 | 1/2012 | Zheludev et al. |
| 2012/0139230 A1 | 6/2012 | Whiteman et al. |
| 2017/0203601 A1 | 7/2017 | Yashiki |
| 2017/0334232 A1 | 11/2017 | Yashiki et al. |

FOREIGN PATENT DOCUMENTS

| | | | |
|---|---|---|---|
| JP | 2009-192676 | 8/2009 | |
| JP | 2011-123186 | 6/2011 | |
| JP | 4925025 | 4/2012 | |
| JP | 2012-250575 | 12/2012 | |
| JP | 2013-008113 | 1/2013 | |
| JP | 2017-087677 | 5/2017 | |
| JP | 2018-112732 | 7/2018 | |
| KR | 10-1451774 | 10/2014 | |
| WO | WO 2010/119247 | 10/2010 | |
| WO | WO 2015/182108 | 12/2015 | |
| WO | WO 2016/075928 | 5/2016 | |
| WO | WO 2017/086363 | 5/2017 | |
| WO | WO-2017204168 A1 * | 11/2017 | ........... B42D 25/324 |
| WO | WO 2018/131665 | 7/2018 | |

* cited by examiner

| | COMPARATIVE EXAMPLE | EXAMPLE 1 | EXAMPLE 2 | EXAMPLE 3 | EXAMPLE 4 |
|---|---|---|---|---|---|
| THICKNESS OF COLOR DEVELOPING LAYER (μm) | - | 0.8 | 3 | 30 | 80 |
| VISUAL QUALITY OF COLOR | POOR | FAIR | GOOD | GOOD | GOOD |

FIG. 4

| | COMPARATIVE EXAMPLE | EXAMPLE 1 | EXAMPLE 2 | EXAMPLE 3 | EXAMPLE 4 |
|---|---|---|---|---|---|
| THICKNESS FROM UPPER SURFACE OF RIDGE (μm) | - | 0.2 | 1 | 5 | 80 |
| VISUAL QUALITY OF COLOR | POOR | FAIR | GOOD | GOOD | FAIR |

FIG. 7

STRUCTURAL COLOR DEVELOPING MEMBER AND TIRE

TECHNICAL FIELD

The present technology relates to a structural color developing member having a region that develops color with a structural color and a tire using the structural color developing member.

BACKGROUND ART

A conventional structural color developed by a fine structure sized equal to or smaller than a wavelength of light has been known and applied in various fields.

For example, a color filter using the color development of a structural color is described in Japan Unexamined Patent Publication No. 2009-192676. Furthermore, a technology for measuring a change in the color development (change in wavelength) of a structural color to calculate strain of an object is described in Japan Patent No. 4925025.

In Japan Unexamined Patent Publication No. 2009-192676, a fine structure that generates the structural color is formed by embossing. In Japan Patent No. 4925025, fine particles are periodically arranged on a surface of an elastic material and thus the structural color is generated.

When the structural color is generated by ridges/grooves as in Japan Unexamined Patent Publication No. 2009-192676 described above, the ridge/groove height is changed and thus the hue can be partially controlled. However, the color changes when visually recognized from different directions and thus may be seen in plural colors (rainbow colors). For example, when a structural color is used to indicate some information (letters, marks, or the like), there is a need to make the information visually recognizable in a single hue associated with the information. In addition, when a structural color is visually recognizable in plural colors, the boundary between a location where the structural color is formed and a location where the structural color is not formed may be unclear.

SUMMARY

The present technology provides a structural color developing member visually recognizable in a single hue and a tire using the structural color developing member.

A structural color developing member according to an embodiment of the present technology includes: a base material including a surface, a portion of which is provided with a fine ridged/grooved structure formed at a constant arrangement pitch, the base material developing a structural color by the fine ridged/grooved structure; and a color developing layer or a polarized reflection layer layered on a surface of the fine ridged/grooved structure. A region of the structural color developing member in which the fine ridged/grooved structure and the color developing layer or the fine ridged/grooved structure and the polarized reflection layer are provided is visually recognized or recognizable in a single hue.

According to an aspect of the present technology, since the color developing layer or the polarized reflection layer is layered on the base material that develops the structural color by the fine ridged/grooved structure, the region of the structural color developing member in which the fine ridged/grooved structure and the color developing layer are provided is visually recognizable in a single hue. When some information (letters, marks, or the like) is desired to be indicated, for example, with the structural color, the information can be visually recognized in a single hue associated with the information. In addition, compared with a case where a structural color is visually recognized in plural colors, advantageously, the boundary between a location where the structural color is formed and a location where the structural color is not formed can be clearly identified.

BRIEF DESCRIPTION OF DRAWINGS

FIG. 4 is a table indicating the visual evaluation results of a structural color developing member 30.

FIG. 7 is a table indicating the visual evaluation results of a structural color developing member 40.

DETAILED DESCRIPTION

First Embodiment

Herein, a structural color developing member and a tire according to preferred embodiments of the present technology will be described in detail below with reference to the accompanying drawings.

In the present embodiment, an example in which the structural color developing member according to the present technology is applied to a vehicle tire will be described.

In addition, in a first embodiment of the present technology, a case where a color developing layer is layered on a surface of a fine ridged/grooved structure will be described.

Figure 1:
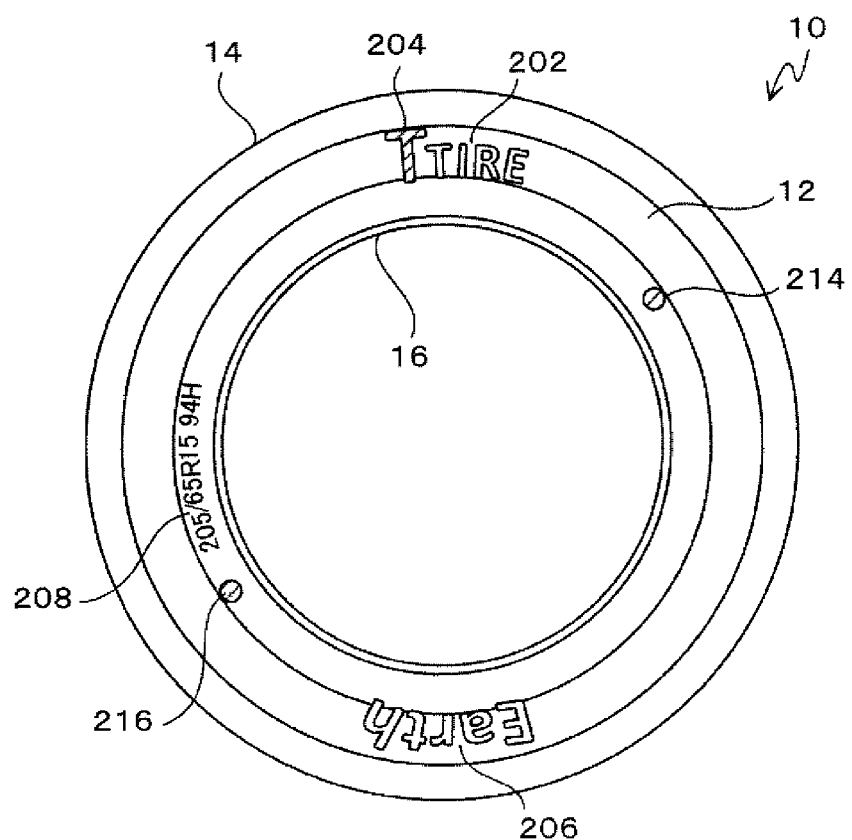
FIG. 1 is a side view of a vehicle tire 10 according to a first embodiment of the present technology.

FIG. 1 is a side view of a vehicle tire 10 according to an embodiment of the present technology.

The vehicle tire 10 includes a tread portion 14 having a tread surface contactable with a road surface, a bead portion 16 engaged with a wheel (not illustrated), and a sidewall portion 12 connecting the tread portion 14 and the bead portion 16 to form a tire side surface.

While wear resistance is emphasized on the tread portion 14, resistance against deformation caused by a load during driving is emphasized on the sidewall portion 12, and the composition of the sidewall portion 12 is different from that of the tread portion 14.

More specifically, in the present embodiment, the sidewall portion 12 includes diene rubber, carbon black, and silica. The diene rubber contains 30 to 70 mass % of natural rubber and/or isoprene rubber. The carbon black has a nitrogen adsorption specific surface area of 20 to 60 $m^2/g$. The content of the carbon black is 5 to 45 parts by mass per 100 parts by mass of the diene rubber, and the content of the silica is 15 to 55 parts by mass per 100 parts by mass of the diene rubber. The total content of the carbon black and the silica is 30 to 60 parts by mass per 100 parts by mass of the diene rubber.

Further, various types of information are indicated on the sidewall portion 12.

As an example of the information indicated on the sidewall portion 12 may include, for example, a manufacturer name 202 ("TIRE" in the example of FIG. 1) of a maker that manufactures the vehicle tire 10, a manufacturer logo mark 204 ("T" in the example of FIG. 1), a tire brand name 206 ("Earth" in the example of FIG. 1), tire dimensions 208 ("205/65R15 94H" in the example of FIG. 1), a uniformity mark 214, a light point mark 216, and the like. In addition to the information described above, a manufacturing number, a rotation direction, and the like are indicated on the sidewall portion 12.

Of the information described above, the uniformity mark 214 and the light point mark 216 are marked with ink or the like after tires are completed (vulcanized) and then inspected.

Moreover, recesses/protrusions formed in molding tools (molds) are transferred during vulcanization of the vehicle tire 10 and thus the manufacturer name 202, the manufacturer logo mark 204, the tire brand name 206, the tire dimensions 208, and the like are marked.

Of the information transferred by the recesses and protrusions of the molds, the information other than the logo mark 204 is the same color as the entire vehicle tire 10, and each piece of information is visually recognizable by ridges and grooves on the surface of the sidewall portion 12.

Meanwhile, the logo mark 204 is formed to be visually recognized in a color, such as a manufacturer's corporate color, different from the color of the vehicle tire 10.

Figure 2A:
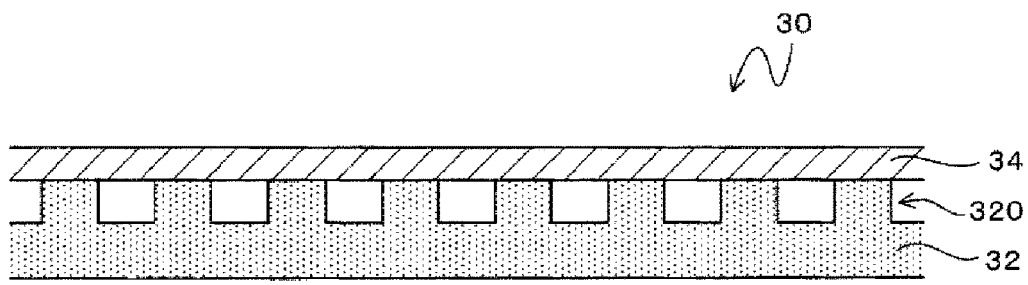
FIGS. 2A to 2C are enlarged views of a logo mark 204 portion according to the first embodiment of the present technology.
Figure 2B:
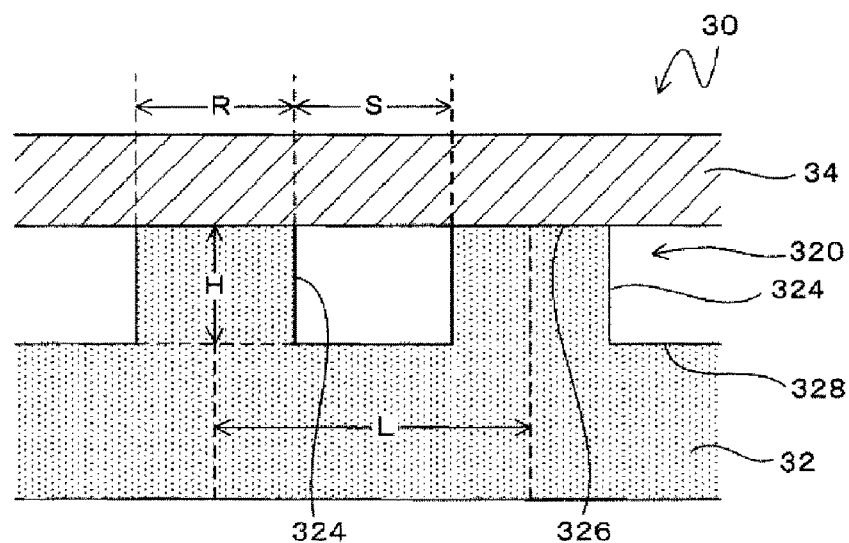
Figure 2C:
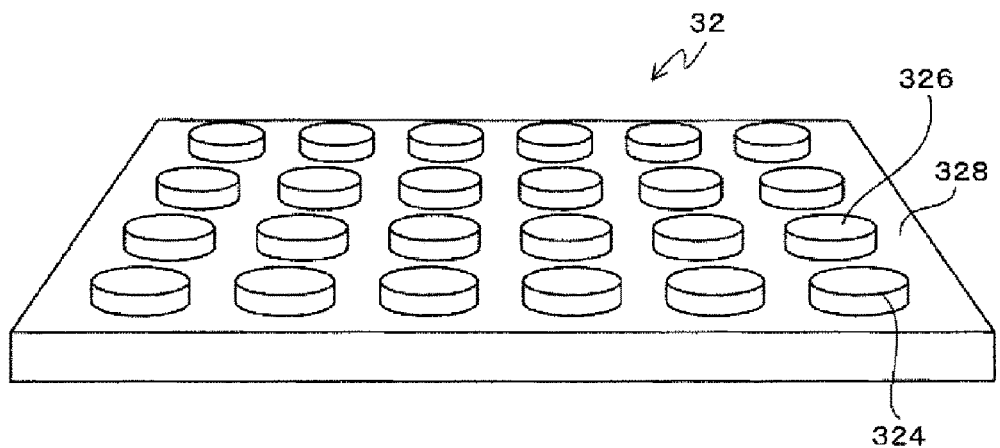

FIGS. 2A to 2C are enlarged views of the logo mark 204 portion. FIG. 2A is a cross-sectional view, and FIG. 2B is an enlarged view of FIG. 2A. FIG. 2C is a perspective view of a base material 32.

The logo mark 204 portion of the vehicle tire 10 is formed of a structural color developing member 30 that includes the base material 32 and a color developing layer 34.

A fine ridged/grooved structure 320 having a constant arrangement pitch is formed on at least a portion of a surface of the base material 32, and a structural color is developed by the fine ridged/grooved structure 320.

In the present embodiment, the base material 32 is a partial region of the tire, which configures the sidewall portion 12, and the base material 32 includes diene rubber, carbon black, and silica as described above. Thus, the base material 32 is formed including carbon black that is a black material, and regions other than the fine ridged/grooved structure 320 of the base material 32 are visually recognized in black. Further, the base material 32 is formed including a soft polymeric material, in particular, diene rubber that is a rubber composition.

Note that a material configuring the base material 32 is not limited to the material above, and various known materials can be applied to the base material 32. For example, the base material 32 may include: rubber compositions of a soft polymeric material representative of polyethylene or polyester, non-diene rubber such as ethylene propylene rubber or acrylic rubber, urethane rubber, silicone rubber, fluorine-contained rubber, and the like.

As illustrated in FIGS. 2A to 2C, the fine ridged/grooved structure 320 is formed such that fine ridged/grooved portions 324 are provided on a surface 328 of the base material 32 at a constant arrangement pitch. A region where the fine ridged/grooved structure 320 is provided is visually recognized by the structural color in a color different from other regions of the base material 32 (in black in the present embodiment).

Here, the fine ridged/grooved portions 324 are various known structures such as protrusions and holes that are used to obtain the structural color. In the present embodiment, the fine ridged/grooved portions 324 are fine ridges protruding from the surface 328, as a curved surface (or a flat surface) in the present embodiment, of the base material 32.

In addition, the arrangement pitch corresponds to a distance between the centers of the fine ridges located side by side, i.e., a pitch L in the present embodiment. As illustrated in FIG. 2B, the pitch L matches the total length of each of the ridges and each of grooves along the surface of the rubber member (tire) (the sum of a diameter R of each of cylinders in FIG. 2B and a distance S between side surfaces of the cylinders located side by side in FIG. 2B).

In addition, the constant arrangement pitch corresponds to various known cycles (pitches) used to obtain a structural color, and the constant arrangement pitch may be uniform in the entire fine ridged/grooved structure 320 or may be continuously or gradually changed.

The constant arrangement pitch or the ridge/groove height of the fine ridged/grooved portions 324 is determined based on a wavelength of visible light corresponding to a color visually recognized as the structural color. In other words, a wavelength corresponding to a color to be represented as the structural color is selected from a wavelength band classified as visible light, and specific dimensions of the arrangement pitch or the ridge/groove height of the fine ridged/grooved portions 324 are determined by the resonant grating principle.

In the present embodiment, the arrangement pitch or the ridge/groove height of the fine ridged/grooved portions 324 is configured to be, for example, 650 nm or smaller. This is because, as a result of experiments performed by the present inventors, the structural color was recognized in a range where the arrangement pitch or the ridge/groove height of the fine ridged/grooved portions 324 is 650 nm or smaller.

In the present embodiment, each of the fine ridged/grooved portions 324 is a cylinder protruding in a direction orthogonal to the surface 328 of the base material 32. An upper surface 326 of the cylinder is a perfect circle, and the diameter R of the circle is approximately 5 μm. Further, the distance S between the cylinders located side by side is 1 μm and the arrangement pitch (pitch L) is approximately 6 μm. Note that for illustration convenience in FIGS. 2A to 2C, the distance S and the pitch L are indicated with a ratio different from the actual dimensions.

Here, the present inventors prepared plural rubber members by changing the height (ridge/groove height) H of the fine ridged/grooved portions 324 from the surface 328 while fixing the arrangement pitch of the fine ridged/grooved portions 324 or the diameter of each of the cylindrical fine ridged/grooved portions 324. As a result, the following structural colors were visually recognized in descending order of the area visually recognized. Since the structural colors differ from each other when observed at different angles, the plural structure colors are visually recognizable.

Ridge/groove height 650 nm: red, purple-red
Ridge/groove height 607 nm: purple-red, red, orange
Ridge/groove height 577 nm: purple-red, orange
Ridge/groove height 536 nm: orange, purple-red
Ridge/groove height 500 nm: yellow, green, orange Herein, as the ridge/groove height was smaller, the color became more bluish.

As just described, the arrangement pitch or the ridge/groove height of the fine ridged/grooved portions 324 is adjusted and thus information can be indicated in any color on the rubber surface. For example, in a case where the logo mark 204 portion is desirably represented in red, the ridge/groove height may be set at approximately 650 nm.

The color developing layer 34 is layered on the surface of the fine ridged/grooved structure 320. In other words, the color developing layer 34 is positioned in the incident direction (viewing direction) of light with respect to the fine ridged/grooved structure 320. The color developing layer 34 contains at least one of a substance (for example, a typical color developing pigment) that absorbs a specific wavelength component of incident light and allows a hue of the transmitted wavelength component to be visually recognized, or a substance (for example, a fluorescent pigment) that absorbs a specific wavelength component of incident light and thus emits light by excitement of electrons, which is caused by absorption of the specific wave length component.

For example, when the color developing layer 34 develops color with a typical color developing pigment, the hue of the color developing layer 34 is preferably a hue included in color development of the base material 32 with the structural color (at least a portion of a wavelength component of the structural color is transmitted). For example, when the ridge/groove height of the fine ridged/grooved portions 324 is 607 nm to obtain the structural color of purple-red, red, or orange, the hue of the color developing layer 34 is preferably purple-red, red, or orange.

In addition, when the color developing layer 34 develops color with a fluorescent pigment, the wavelength component absorbed by the color developing layer 34 preferably includes the wavelength component of the structural color.

In addition to an acrylic coating material, typical paints such as an urethane-based paint can be used as a material of the color developing layer 34.

Figure 3A:
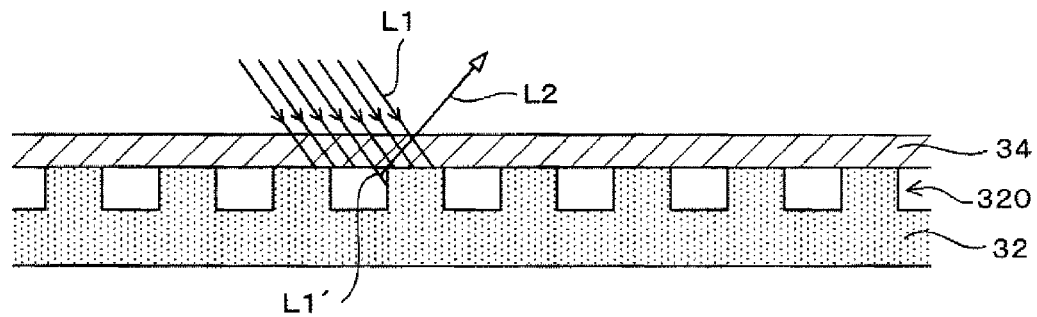
FIGS. 3A to 3C are explanatory diagrams schematically illustrating the behavior of light according to the present technology (first embodiment) and a comparative example.
Figure 3B:
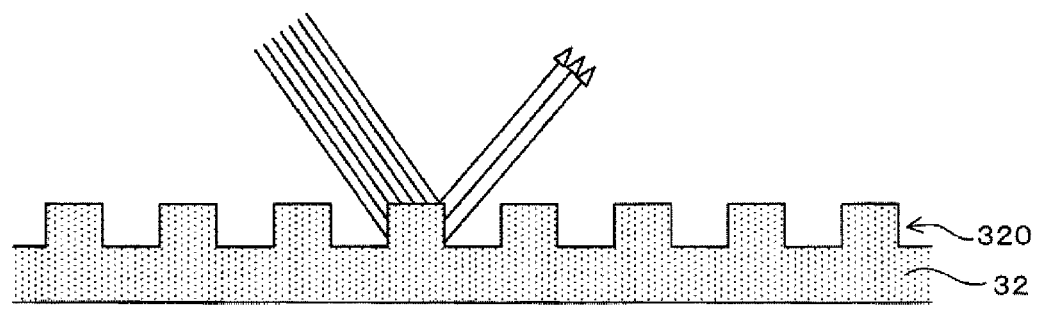

As schematically illustrated in FIG. 3B, a conventional structural color is not a completely single color and changes when viewed at different angles, and the conventional structural color may be visually recognized in rainbow colors. In other words, in a case where only the fine ridged/grooved structure 320 is provided on the base material 32, only a specific wavelength component of incident light L1 becomes reflected light L2, and the reflected light L2 includes a wavelength component of plural hues. Accordingly, the plural hues are visually recognized.

Figure 3C:
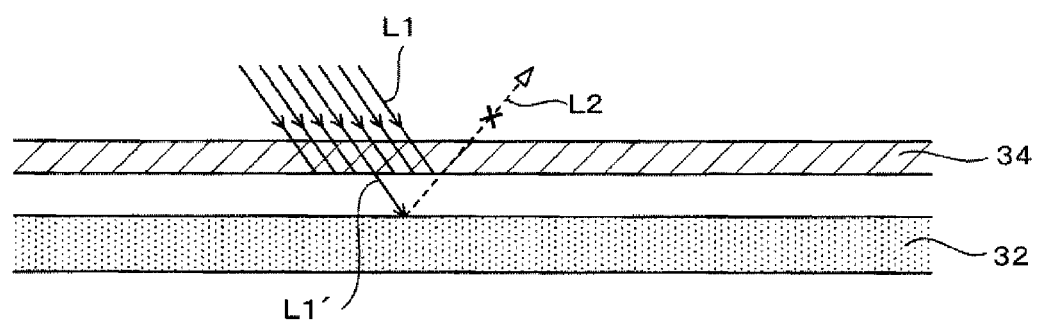

Further, when the color developing layer 34 that absorbs a specific wavelength is layered on the black base material 32 such as rubber for a tire, the color is not visible. This is because all wavelengths of light are absorbed by the base material 32 as schematically illustrated in FIG. 3C. In other words, when the color developing layer 34 is layered on the base material 32 without providing the fine ridged/grooved structure 320, most of the components of the incident light L1 is absorbed by the color developing layer 34 and only a component L1' corresponding to a single color reaches the base material 32. Meanwhile, since the base material 32 is black, the component L1' is also absorbed and the reflected light L2 cannot be obtained. Note that for illustration convenience in FIG. 3C, the base material 32 and the color developing layer 34 are illustrated in a separate state from each other.

On the other hand, as in the first embodiment, the color developing layer 34 that absorbs a specific wavelength to develop color or produce fluorescence is layered on the surface of the fine ridged/grooved structure 320 that develops the structural color, and thus as schematically illustrated in FIG. 3A, incident light that reaches the fine ridged/grooved structure 320 and light reflected from the fine ridged/grooved structure 320 are selected by the color developing layer 34. Consequently, the structural color of rainbow colors is visually recognized in a single hue.

In other words, when the color developing layer 34 is layered on the base material 32 provided with the fine ridged/grooved structure 320, most of the components of the incident light L1 is absorbed by the color developing layer 34 and only the component L1' corresponding to the single color reaches the base material 32. The base material 32 is structured such that only a specific wavelength of the component L1' is reflected by the fine ridged/grooved structure 320, and thus the reflected light L2 is generated. Since the reflected light L2 is included in a wavelength band transmissive through the color developing layer 34, the reflected light L2 reaches the outside of the structural color developing member 30 and thus is visually distinguished from the color of the base material 32.

Note that in the present embodiment, the single hue is at a level recognizable substantially as a single color by the color discrimination ability of a normal person, and the single hue does not have completely the same wavelength as a laser beam. For example, as in the case of the aforementioned fine ridged/grooved portions 324 having the ridge/groove height of 607 nm, the single hue of the present embodiment is not the distribution of colors such as "purple-red, red, and orange" but is a single color substantially identified as "red".

Next, a method of manufacturing the structural color developing member 30 will be described.

Note that prior to the following steps, the hue of the pattern or the like to be added on the vehicle tire 10 is determined, and then the arrangement pitch or the ridge/groove height of the fine ridged/grooved portions is determined based on the wavelength of visible light corresponding to the hue (the color visually recognizable as the pattern or the like on the vehicle tire 10) (arrangement pitch determination step or ridge/groove height determination step).

(Step 1) To form the fine ridged/grooved structure 320 on the surface of the base material 32, a mask having pattern structures disposed at a constant pitch is formed (mask forming step).

First, a chromium (Cr) film of about 80 nm is formed on a mask forming substrate (silicon substrate) with the use of a sputtering apparatus. Next, a positive electron beam resist is spin-coated (for 3 seconds at 300 rpm and subsequently for 60 seconds at 4000 rpm) on the chromium film. Thereafter, the substrate is pre-baked on a hot plate at 150° C. for 3 minutes, and the substrate coated with the electron beam resist is exposed to light with the use of an electron beam lithography system. Then, after patterning, the substrate is immersed in a developing solution for 60 seconds to develop the film. Note that when the arrangement pitch of the fine ridged/grooved portions 324 is determined based on the wavelength of visible light corresponding to a color visually recognized as the structural color, i.e., when the arrangement pitch of the fine ridged/grooved portions 324 is used as a parameter for determining color development of the structural color, the arrangement pitch of pattern structures during patterning is determined based on the arrangement pitch determined in the arrangement pitch determination step. After development, the substrate is immersed in a mixed-acid chromium etching solution for about 60 seconds, and only the exposed Cr is selectively dissolved to create a mask (photomask).

(Step 2) The mask is disposed on a substrate formed of metal or a semiconductor material, and the substrate is etched (etching step).

In the present embodiment, a single crystalline silicon substrate is used as the substrate. The substrate is cleaned ultrasonically for five minutes with acetone and methanol in the mentioned order, and a positive photoresist is spin-coated on the substrate (for 3 seconds at 300 rpm and subsequently for 60 seconds at 5000 rpm). Next, the substrate is pre-baked on the hot plate at 95° C. for 90 seconds. Thus, an organic solvent contained in the resist can be evaporated to improve adhesion with the substrate. Subsequently, the substrate coated with the photoresist is exposed to light with the use of a mask aligner and the photomask produced in Step 1. Then, the substrate is immersed in a developing solution to dissolve out portions exposed to light, and thus patterning is performed.

After patterning, the substrate is etched with the use of a dry etching device (passivation gas: $C_4F_8$, 80 sccm, etching gas: $SF_6$, 130 sccm, Bosh process) to produce a mold (silicon mold). Note that when the ridge/groove height of the fine ridged/grooved portions 324 is determined based on the wavelength of visible light corresponding to a color visually recognized as the structural color, i.e., when the ridge/groove height of the fine ridged/grooved portions 324 is used as a parameter for determining color development of the structural color, the etching time of the substrate is appropriately controlled and thus the ridge/groove height of the fine ridged/grooved portions 324 can be matched with the ridge/groove height determined in the ridge/groove height determination step.

In addition, a case where the mold including the fine ridged/grooved structure is produced by photolithography technique is described in the foregoing Steps 1 and 2 (mold forming step). Alternatively, a method of manufacturing a rubber member according to an embodiment of the present technology is not limited to the case above, and various known methods can be applied to the method of manufacturing a rubber member.

(Step 3) Unvulcanized rubber is adhered to the etched substrate (mold), and then the unvulcanized rubber is vulcanized to transfer the fine ridged/grooved structure to the rubber surface (transfer step).

The unvulcanized rubber is placed on the silicon mold to be softened for 10 minutes at 80° C., and then is pressed and vulcanized at 160° C. for approximately 10 minutes.

After vulcanization, the vulcanized rubber is removed from the silicon mold, and then it is confirmed that the fine ridged/grooved structure 320 is transferred to the rubber surface (the surface of the base material 32). The region where the fine ridged/grooved structure 320 is formed is visually recognized in a different color from other regions (flat surface regions) on the surface of the base material 32, i.e., in the structural color developed by the fine ridged/grooved structure 320.

(Step 4)

An acrylic paint, which becomes the color developing layer 34, is applied with an air brush to the surface of the region of the base material 32 in which the fine ridged/grooved structure 320 is formed. Note that, in addition to an air brush, a general method such as spin coating, a brush, or the like can be used as a tool used to apply paint.

FIG. 4 is a table indicating the visual evaluation results of the structural color developing member 30 produced as described above.

FIG. 4 indicates four examples (Examples 1 to 4) where the thickness of the color developing layer 34 was changed together with the results of a case as a comparative example where a color developing layer 34 was not provided.

The thickness of the color developing layer 34 was a thickness from the upper surfaces 326 of the fine ridged/grooved portions 324 of the base material 32 (the apex of the ridges protruding from the surface 328 of the base material 32) in a direction opposed to the surface 328 of the base material 32. In Example 1, the thickness of the color developing layer 34 was set at 0.8 µm. In Example 2, the thickness of the color developing layer 34 was set at 3.0 µm. In Example 3, the thickness of the color developing layer 34 was set at 30.0 µm. In Example 4, the thickness of the color developing layer 34 was set at 80.0

Note that the thickness of the color developing layer 34 was measured by a scanning electron microscope (SEM: Scanning Electron Microscope).

In the comparative example, the light of various wavelengths was reflected and thus the structural color developing member 30 was visually recognized in rainbow colors (evaluation: poor). In Example 1, other colors appeared in a portion of the structural color developing member 30, and in the meanwhile, the structural color developing member 30 was visually recognized in a single color compared with the comparative example (evaluation: fair). Further, in Examples 2 to 4, the structural color developing member 30 was visually recognized in a single color (evaluation: good).

As just described, the color developing layer 34 is formed on the surface of the base material 32 that develops the structural color. Accordingly, it was confirmed that the structural color was visually recognized in a single hue.

Note that the thickness of the color developing layer 34 is preferably from 0.8 µm to 80.0 µm. This is because when the color developing layer 34 is too thin, the color developing layer 34 does not develop color. In contrast, when the color developing layer 34 is too thick, the color developing layer 34 does not allow penetration of light or peels off.

As described above, the structural color developing member 30 according to the first embodiment is structured such that the color developing layer 34 having a predetermined thickness is layered on the base material 32 that develops the structural color by the fine ridged/grooved structure 320. Accordingly, the region where the fine ridged/grooved structure 320 and the color developing layer 34 are visually recognizable in a single hue.

For example, when the logo mark 204 is attached to the vehicle tire 10 with the structural color as in the present embodiment, a manufacturer's corporate color usually used in the logo mark 204 can be visually recognized in a single color, and advantageously, recognition of the logo mark 204 and the corporate color is enhanced and an integrated brand image is established.

In addition, compared with a case where the structural color is visually recognized in plural colors, the boundary between a location where the structural color is formed and a location where the structural color is not formed can be clearly distinguished, and advantageously, recognition accuracy of information represented by the structural color can be improved.

Second Embodiment

In a second embodiment according to the present technology, a case where the polarized reflection layer is layered on the surface of the fine ridged/grooved structure will be described. Note that, detailed descriptions and illustrations of the same locations as those of the first embodiment will be omitted in the second embodiment.

Figure 5A:
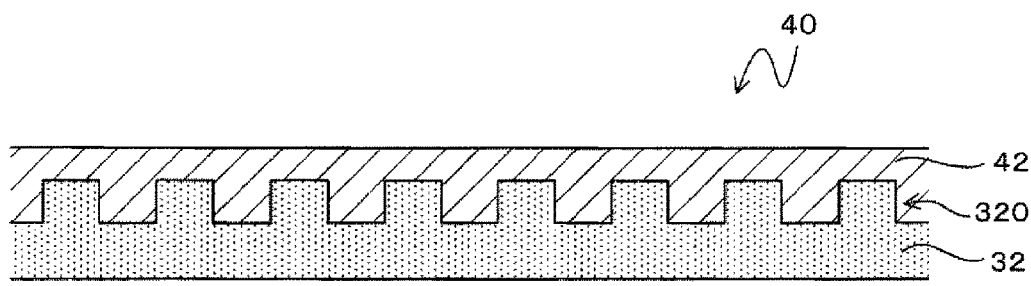
FIG. 5 is an enlarged view of the logo mark 204 portion according to a second embodiment of the present technology.
Figure 5B:
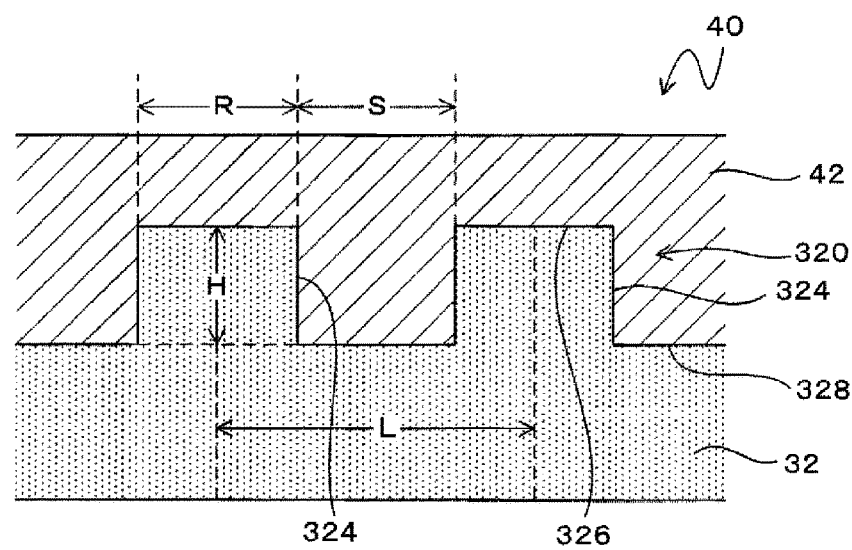
Figure 5C:
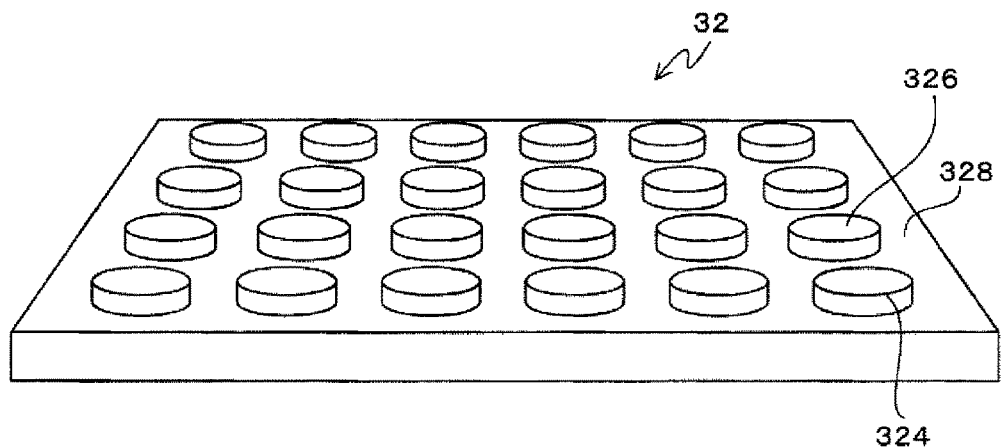

FIG. 5 is an enlarged view of the logo mark 204 (see FIG. 1) portion of the vehicle tire 10 according to the second embodiment. FIG. 5A is a cross-sectional view, and FIG. 5B is an enlarged view of FIG. 5A. FIG. 5C is a perspective view of the base material 32.

In the second embodiment, the logo mark 204 portion of the vehicle tire 10 includes a structural color developing member 40 provided with the base material 32 and the polarized reflection layer 42.

Note that, as in the first embodiment, the fine ridged/grooved structure 320 having a constant arrangement pitch is formed on at least a portion of the surface of the base material 32, and the structural color is developed by the fine ridged/grooved structure 320.

The polarized reflection layer 42 is layered on the surface of the fine ridged/grooved structure 320. In other words, the polarized reflection layer 42 is positioned in the incident direction (viewing direction) of light with respect to the fine ridged/grooved structure 320. More specifically, the polarized reflection layer 42 is formed to fill the volume from the grooves of the fine ridged/grooved structure 320 (the surface 328 of the base material 32 in the present embodiment) to the apex (the upper surfaces 326) of the ridges (the fine ridged/grooved portions 324) of the fine ridged/grooved structure 320. The polarized reflection layer 42 is formed to have a certain thickness above the apex (the upper surfaces 326) (in the opposite direction from the surface 328).

In the present embodiment, the polarized reflection layer 42 is formed including cholesteric liquid crystal.

Figure 8:
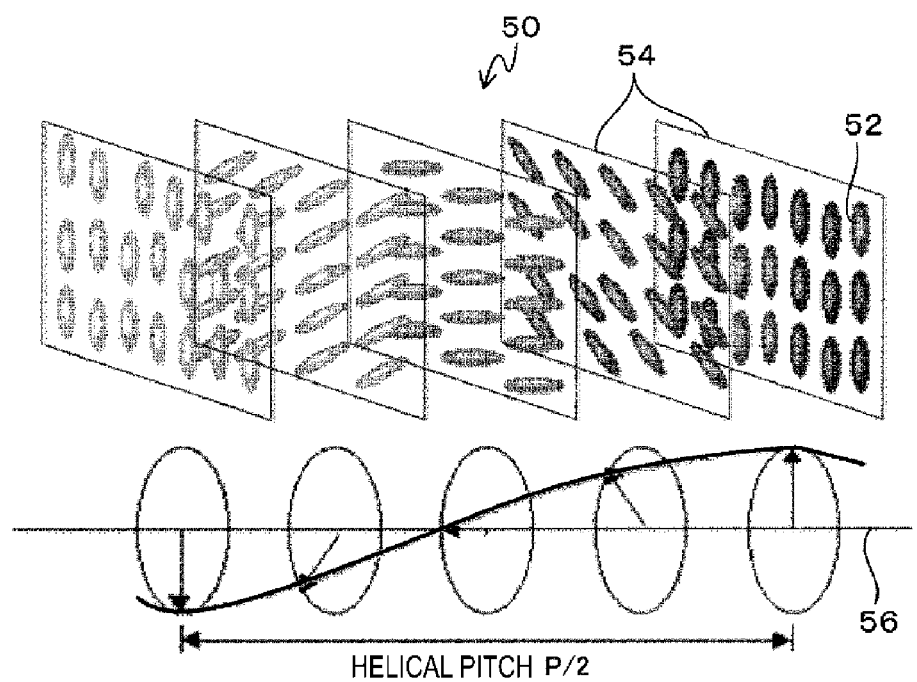
FIG. 8 is an explanatory diagram schematically illustrating cholesteric liquid crystal.

FIG. 8 is an explanatory diagram schematically illustrating cholesteric liquid crystal. Cholesteric liquid crystal 50 includes a layer structure where bar-shaped molecules 52 are multilayered. In each of layers 54, the molecules 52 are unidirectionally arranged, and the layers 54 are accumulated such that the arrangement directions of the molecules 52 form a helical shape. Typically, a helical axis 56 is a direction perpendicular to each of the layers 54, and the helical axis 56 includes a helical structure having a constant pitch. The pitch of the helix is equal to a wavelength, and circular polarized light is reflected in the same direction as the winding of the helix.

The Cholesteric liquid crystal is formed by adding an additive referred to as chiral agent, which imparts twisting to liquid crystal molecules, to nematic liquid crystals arranged in parallel without having a layer structure.

Additionally, the polarized reflection layer 42 preferably has transmission performance in a wavelength band that includes wavelengths selectively reflected from the fine ridged/grooved structure 320. For example, when the ridge/groove height of the fine ridged/grooved portions 324 is 607 nm to obtain the structural color of purple-red, red, or orange, the length of light reflected from the fine ridged/grooved structure 320 is approximately 750 nm to 590 nm. In this case, the polarized reflection layer 42 is preferably formed to transmit the wavelength band including the wavelength.

Figure 6A:
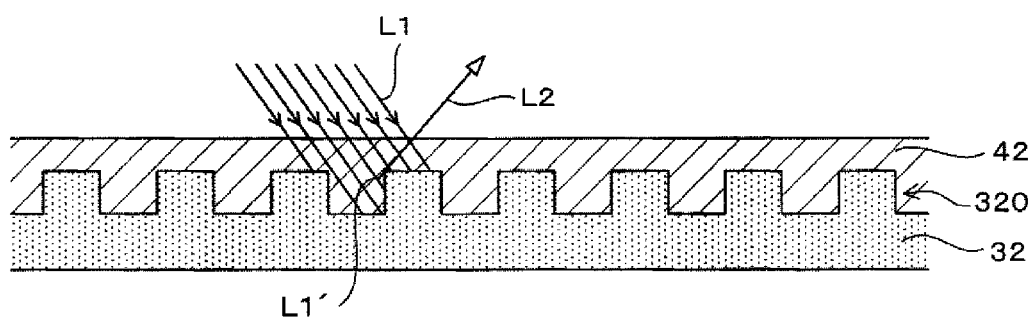
FIG. 6 is an explanatory diagram schematically illustrating the behavior of light in the present technology (second embodiment) and a comparative example.
Figure 6B:
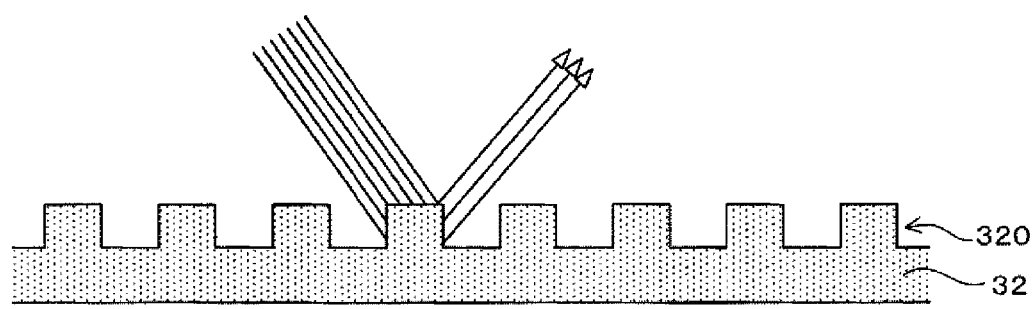

As schematically illustrated in FIG. 6B, a conventional structural color is visually recognized completely in a single color and changes when viewed at different angles, and thus is visually recognized in rainbow colors. In other words, in a case where only the fine ridged/grooved structure 320 is provided on the base material 32, only a specific wavelength component of incident light L1 becomes reflected light L2, and the reflected light L2 includes a wavelength component of plural hues. Accordingly, the plural hues are visually recognized.

On the other hand, as in the second embodiment, the polarized reflection layer 42 from which only a specific wavelength is reflected is formed (layered) on the surface of the fine ridged/grooved structure 320 that develops the structural color. Thus, as schematically illustrated in FIG. 6A, incident light that reaches the fine ridged/grooved structure 320 and light reflected from the fine ridged/grooved structure 320 are selected by the polarized reflection layer 42. Consequently, the structural color of rainbow colors are visually recognized in a single hue.

In other words, when the polarized reflection layer 42 is layered on the base material 32 provided with the fine ridged/grooved structure 320, most of the components of the incident light L1 is absorbed by the polarized reflection layer 42, and only the component L1' corresponding to the single color reaches the base material 32. The base material 32 is structured such that only a specific wavelength of the component L1' is reflected by the fine ridged/grooved structure 320, and thus the reflected light L2 is generated. Since the reflected light L2 is included in a wavelength band transmissive through the polarized reflection layer 42, the reflected light L2 reaches the outside of the structural color developing member 40 and thus is visually distinguished from the color of the base material 32.

Next, a method of manufacturing the structural color developing member 40 will be described.

In manufacturing of the structural color developing member 40, in the same way as in the first embodiment, and then the arrangement pitch or the ridge/groove height of the fine ridged/grooved portions is determined based on the wavelength of visible light corresponding to the hue (arrangement pitch determination step or ridge/groove height determination step).

Thereafter, the aforementioned Steps 1 to 3 (mask forming step, etching step, and transfer step) are performed to obtain the base material 32 on which the fine ridged/grooved structure 320 is formed.

Afterward, as Step 4, a chloroform solution of cholesteric liquid crystal is applied with an air brush to the surface of the region of the base material 32 in which the fine ridged/grooved structure 320 is formed, and thus the polarized reflection layer 42 is formed.

Cholesteryloleylcarbonate (available from Tokyo Chemical Industry Co., Ltd.)/Cholesterol Nonanoate (available from Tokyo Chemical Industry Co., Ltd.)/Cholesterol Benzoate (available from Tokyo Chemical Industry Co., Ltd.) are mixed at a weight ratio of 50/40/10 to be applied as the cholesteric liquid crystal.

In addition to an air brush, a general method such as spin coating, a brush, or the like can be used as a tool used to apply paint.

FIG. 7 is a table indicating the visual evaluation results of the structural color developing member 40 produced as described above.

FIG. 7 indicates four examples (Examples 1 to 4) where the thickness of the polarized reflection layer 42 was changed together with the results of a case as a comparative example where the polarized reflection layer 42 was not provided.

The thickness of the polarized reflection layer 42 was a thickness from the upper surfaces 326 of the fine ridged/grooved portions 324 of the base material 32 (the apex of the ridges protruding from the surface 328 of the base material 32) in a direction opposed to the surface 328 of the base material 32. In Example 1, the thickness of the polarized reflection layer 42 was set at 0.2 μm. In Example 2, the thickness of the polarized reflection layer 42 was set at 1.0 μm. In Example 3, the thickness of the polarized reflection layer 42 was set at 5.0 μm. In Example 4, the thickness of the polarized reflection layer 42 was set at 80.0 μm.

Note that the thickness of the polarized reflection layer 42 was calculated from the weight of the applied liquid crystal solution.

In the comparative example, the light of various wavelengths was reflected and thus the structural color developing member 40 was visually recognized in rainbow colors (evaluation: poor). In Examples 1 and 4, other colors appeared in a portion of the structural color developing member 40, and in the meanwhile, the structural color developing member 40 was visually recognized in a single color compared with the comparative example (evaluation: fair). Further, in Examples 2 and 3, the structural color developing member 40 was visually recognized in a single color (evaluation: good).

As just described, the polarized reflection layer 42 is formed on the surface of the base material 32 that develops the structural color. Accordingly, it was confirmed that the structural color was visually recognized in a single hue.

As described above, the structural color developing member 40 according to the second embodiment is structured such that the polarized reflection layer 42 is formed on the upper surface of the base material 32 that develops the structural color by the fine ridged/grooved structure 320. Accordingly, in the same way as in the first embodiment, the region where the fine ridged/grooved structure 320 and the polarized reflection layer 42 are visually recognizable in a single hue.

Note that in the present embodiment, the shape of each of the fine ridged/grooved portions 324 is a cylindrical projection, but not limited thereto. Various conventionally well-known shapes known as a structure for representing a structural color can be applied. For example, the shape of the fine ridged/grooved portion 324 may be a conical projection or a lattice-shaped protrusion. In addition, the fine ridged/grooved structure 320 may be a hole or a lattice-shaped groove formed in the rubber surface. In this case, the shape of the hole may also be, for example, a cylindrical shape, a conical shape, or the like, and fine particles or the like may be disposed on the bottom (the apex of the cone) of the hole formed in a conical shape.

In the present embodiment, an example in which the structural color developing member 30, 40 according to the present technology is applied to the vehicle tire 10 has been described, but the structural color developing member 30, 40 is not limited thereto, and is suitable for various known rubber members, particularly those to which vulcanization is applied in the manufacturing process.

Further, in the present embodiment, only the logo mark 204 is represented by the structural color developing member 30, 40, but not limited thereto. Alternatively, other information indicated on the sidewall portion 12 of the vehicle tire 10 may be represented by the structural color developing member 30, 40. Furthermore, the structural color developing member 30, 40 may be formed on the entire vehicle tire 10, and the entire vehicle tire 10 may be visually recognized in a specific color.

Moreover, in the present embodiment, the present technology is applied to the information indicated on the sidewall portion 12 of the vehicle tire 10, but not limited thereto. Alternatively, the present technology may be applied to information indicated on other locations of the vehicle tire 10.

The invention claimed is:

1. A tire formed using a structural color developing member, the structural color developing member comprising:
a base material including a surface, a portion of which is provided with a fine ridged/grooved structure formed at a constant arrangement pitch, the base material developing a structural color by the fine ridged/grooved structure; and
a color developing layer or a polarized reflection layer layered on a surface of the fine ridged/grooved structure; wherein
a region of the structural color developing member in which the fine ridged/grooved structure and the color developing layer or the fine ridged/grooved structure and the polarized reflection layer are provided is visually recognizable in a single hue.

2. The tire according to claim 1, wherein
the color developing layer is layered on the surface of the fine ridged/grooved structure, and
the color developing layer includes at least one of a substance that absorbs a specific wavelength component of incident light and allows a hue of a transmitted wavelength component to be visually recognized or a substance that emits light by excitement of electrons, which is caused by absorption of a specific wavelength component of the incident light.

3. The tire according to claim 2, wherein
the color developing layer has a thickness of from 0.8 μm to 80 μm.

4. The tire according to claim 1, wherein
the polarized reflection layer is layered on the surface of the fine ridged/grooved structure, and
the polarized reflection layer has transmission performance in a wavelength band that includes a wavelength selectively reflected from the fine ridged/grooved structure.

5. The tire according to claim 4, wherein
the polarized reflection layer is formed including cholesteric liquid crystal.

6. The tire according to claim 4, wherein
the polarized reflection layer is formed to fill from grooves of the fine ridged/grooved structure to an apex of ridges of the fine ridged/grooved structure, and
the polarized reflection layer is formed such that a thickness from the apex of the ridges in a direction opposed to the grooves is from 0 μm to 80 μm.

7. The tire according to claim 1, wherein the base material is formed including a black material, and regions other than the fine ridged/grooved structure of the base material are visually recognized in black.

8. The tire according to claim 1, wherein the base material is made of a soft polymeric material.

9. The tire according to claim 8, wherein the base material is formed including a rubber composition.

10. The tire according to claim 5, wherein
the polarized reflection layer is formed to fill from grooves of the fine ridged/grooved structure to an apex of ridges of the fine ridged/grooved structure, and
the polarized reflection layer is formed such that a thickness from the apex of the ridges in a direction opposed to the grooves is from 0 μm to 80 μm.

11. The tire according to claim 10, wherein the base material is formed including a black material, and regions other than the fine ridged/grooved structure of the base material are visually recognized in black.

12. The tire according to claim 11, wherein the base material is made of a soft polymeric material.

13. The tire according to claim 12, wherein the base material is formed including a rubber composition.

14. A structural color developing member, comprising:
a base material including a surface, a portion of which is provided with a fine ridged/grooved structure formed at a constant arrangement pitch, the base material developing a structural color by the fine ridged/grooved structure; and
a polarized reflection layer layered on a surface of the fine ridged/grooved structure; wherein
a region of the structural color developing member in which the fine ridged/grooved structure and the color developing layer or the fine ridged/grooved structure and the polarized reflection layer are provided is visually recognizable in a single hue.

15. A structural color developing member, comprising:
a base material including a surface, a portion of which is provided with a fine ridged/grooved structure formed at a constant arrangement pitch, the base material developing a structural color by the fine ridged/grooved structure and the base material being made of a soft polymeric material; and
a color developing layer or a polarized reflection layer layered on a surface of the fine ridged/grooved structure; wherein
a region of the structural color developing member in which the fine ridged/grooved structure and the color developing layer or the fine ridged/grooved structure and the polarized reflection layer are provided is visually recognizable in a single hue.

16. A structural color developing member, comprising:
a base material including a surface, a portion of which is provided with a fine ridged/grooved structure formed at a constant arrangement pitch, the base material developing a structural color by the fine ridged/grooved structure; and
a color developing layer or a polarized reflection layer layered on a surface of the fine ridged/grooved structure; wherein
the base material is formed including a black material, and regions other than the fine ridged/grooved structure of the base material are visually recognized in black; and
a region of the structural color developing member in which the fine ridged/grooved structure and the color developing layer or the fine ridged/grooved structure and the polarized reflection layer are provided is visually recognizable in a single hue.

17. A structural color developing member, comprising:
a base material including a surface, a portion of which is provided with a fine ridged/grooved structure formed at a constant arrangement pitch, the base material developing a structural color by the fine ridged/grooved structure; and
a color developing layer layered on a surface of the fine ridged/grooved structure, the color developing layer having a thickness of from 0.8 μm to 80 μm; wherein
a region of the structural color developing member in which the fine ridged/grooved structure and the color developing layer or the fine ridged/grooved structure and the polarized reflection layer are provided is visually recognizable in a single hue.

* * * * *